UNITED STATES PATENT OFFICE.

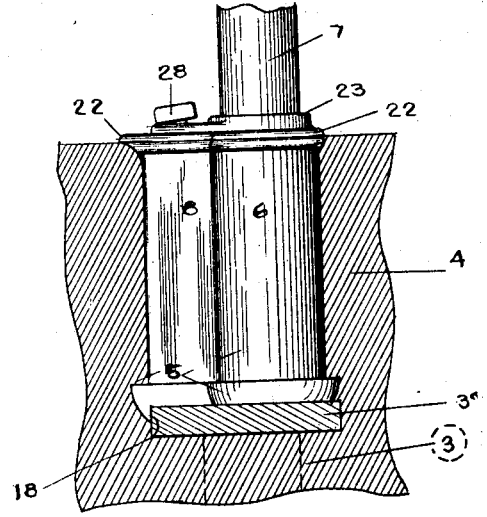
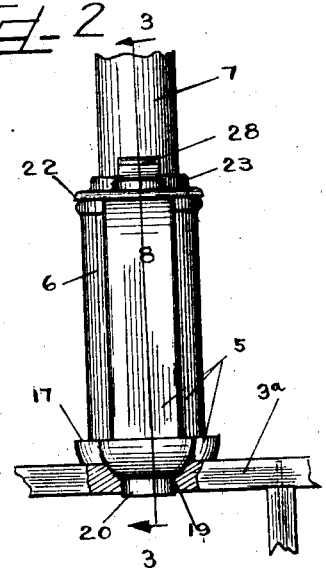
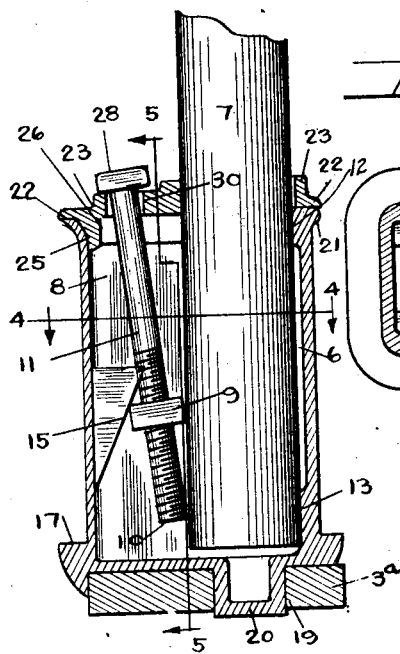
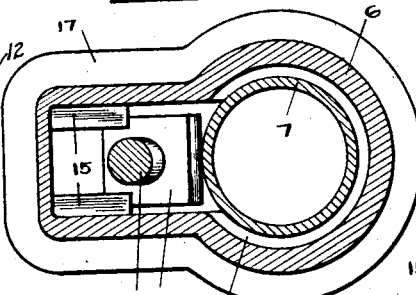
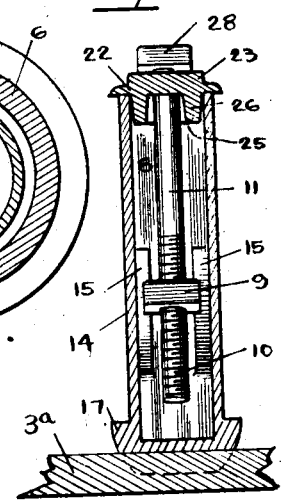

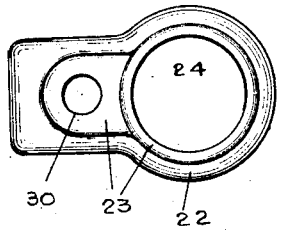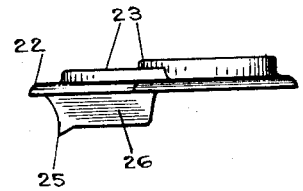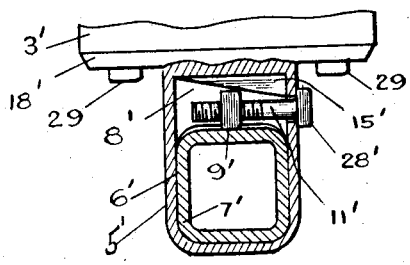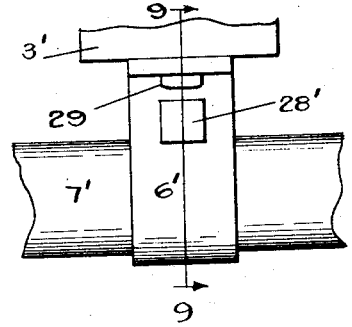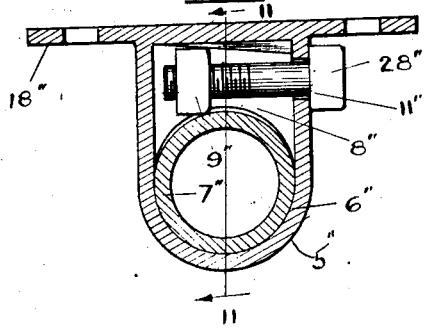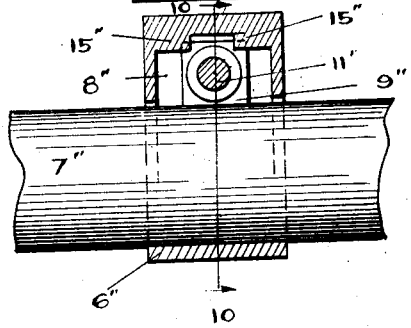

ALFRED W. KNUTSON, OF GALESBURG, ILLINOIS, ASSIGNOR TO ROWE MANUFACTURING CO., A CORPORATION OF ILLINOIS.

COUPLING.

1,388,268.   Specification of Letters Patent.   Patented Aug. 23, 1921.

Application filed August 25, 1919. Serial No. 319,819.

*To all whom it may concern:*

Be it known that I, ALFRED W. KNUTSON, a citizen of the United States, and a resident of the city of Galesburg, in the county of Knox and State of Illinois, have invented certain new and useful Improvements in Couplings; and I do hereby declare that the following is a full, clear, and exact description of the same, reference being had to the accompanying drawings, and to the numerals of reference marked thereon, which form a part of this specification.

The present invention relates to quickly attachable and detachable couplings the elements of which after being assembled in selected positions relatively to each other are locked or held rigidly in the desired relation.

The principal end and object of the invention is to improve generally the construction and increase the capacity, utility and efficiency of devices of this character.

A further object of the invention is to provide improved means for supporting a line of posts such as the metallic stall posts employed in dairy farms.

Another object of the invention is to provide a socket into which the end of a post may be dropped or passed and then held in position by suitable wedging means.

Other and further important objects of the invention will be apparent from the disclosure in the specification and drawings.

The invention (in a preferred form) is illustrated in the drawings and hereinafter more fully described.

In the drawings:

Figure 1 is a side elevation of an anchor embodying the features of this invention.

Fig. 2 is an end elevation of the same.

Fig. 3 is a section on the line 3—3 of Fig. 2.

Fig. 4 is a section on the line 4—4 of Fig. 3.

Fig. 5 is a section on the line 5—5 of Fig. 3.

Fig. 6 is a plan view of the cap.

Fig. 7 is a side elevation of the cap.

Fig. 8 is a front elevation of a modified form of construction.

Fig. 9 is a section on the line 9—9 of Fig. 8.

Fig. 10 is a section through another modification on the line 10—10 of Fig. 11; and Fig. 11 is a section on the line 11—11 of Fig. 10.

As shown in the drawings:

Referring first to the form of construction shown in Figs. 1 to 7 inclusive, 3 designates one of a line of supporting stakes such as are usually set in line prior to mounting the anchors. These stakes support an alinement board 3ª, while the stakes 3, alinement board 3ª and the anchors 5, supported thereby are all embedded in a mass of concrete 4 which forms the stall-floor or curb.

The anchors or sockets 5 are formed with two communicating compartments, namely, a socket-like compartment 6 adapted to receive a post 7, or the like, and a wedge-containing compartment 8 in which a wedge nut 9, and the threaded stem 10 of a wedging-bolt 11 are located. Preferably the compartment 8, is of such width that the nut 9 can slide vertically therein without being able to rotate.

The compartment 6 is provided at its upper portion with a projection 12 and at its lower portion with a projection 13, both conveniently of annular form as shown in Figs. 1 to 7, these serving not only as contact-bosses against which the post 7 may be forced but also as strengthening ribs for the anchor.

The sides 14 of the compartment 8 are provided each with a wedge-shaped, downwardly and outwardly inclined pressure-lug 15, extending from approximately its vertical mid-length to near its bottom. These lugs are spaced apart from each other to allow the stem 10 of the bolt to pass between. Extending preferably entirely around the lower edge of the receptacle 5 is a horizontally arranged anchor-flange 17, one function of which is to resist loosening or withdrawal of the anchor from the concrete.

A guide-flange 18 is provided at the rear edge of the compartment 8 for engagement with the adjacent edge of the alinement-board 3 in order that all the several anchors may be properly set. The alinement board is provided with an aperture 19 preferably a trifle smaller in diameter than a boss 20, projecting downward from the bottom of the anchor 5 so that when the boss has been driven or forced into such aperture the anchor will be supported firmly thereby and by the flange 18 while the concrete is being poured and tamped.

The upper edge of the anchor 5 is provided with a horizontally arranged flange 21 whereon rests the flanges 22 of a cap 23 having an opening 24 (shown in Figs. 1 to 7 as circular) for the passage of the post 7. The underside of the cap has a flange which extends into the top of the chamber 8 and by a wedging action helps to secure the cap against lateral displacement. The portions 26 of this wedge extend along the upper edge of the sides of the chamber 8. The portion 25 of it which extends across the end of the chamber at its upper edge is somewhat broader than the rest of the flange and extends a little lower into the chamber. This tends to thrust the cap against the post 7. The stem 10 of the locking-bolt 11 is projected loosely through an opening 30 in the cap 23 and the head 28 of the bolt rests on top of the cap, where it is readily accessible.

Referring now to the forms of construction shown in Figs. 8 to 11 inclusive, each of these modifications shows a post, passing transversely through an anchor. In Figs. 8 and 9, a post 7' is shown as flat sided and substantially square in cross section. In the anchor as shown, are provided compartments 6' and 8' similar to those in the anchor 5. The anchor is mounted on a support 3', by means of flanges 18' and bolts 29. Within the anchor are arranged wedge-shaped pressure-lugs 15', 15' integral with and projecting from a wall of the compartment 8'. The post is held in place by means of a nut 9' forced into engagement with the post by the bolt 11', which is rotated by means of its externally arranged bolt-head 28'.

Figs. 10 and 11 illustrate a structure differing very slightly from the one shown in Figs. 8 and 9, the principal difference being that the post is circular so that the face of the compartment 6'' is here shown as arcuate. In these figures the attaching flange of the anchor is indicated by 18'', the locked element by 7'', the bolt-containing compartment by 8'', the locking-nut by 9'', the bolt by 11'', and its head by 28'', and the pressure-lugs by 15''. These lugs act as a single wedge on which the nut 9'' travels.

The operation is as follows:

The bolt 11 is turned anti-clockwise by means of its head 28 until the bolt and the nut 9 assume such positions that the post 7 may be passed down through the opening 24 in the cap. The bolt is then rotated in a clock-wise direction. Since the bolt-head 28 is resting on the cap 23 during this movement of the bolt the nut 9 will be drawn upwardly on the pressure-lugs 15 to thereby force the nut 9 toward the post which is supported by the projections 12 and 13. These projections may of course be dispensed with if desired, when the post 7 will be forced against the wall of the compartment 6. As the bolt continues to turn, the nut will be forced into wedging engagement with the post 7 so that the latter is firmly gripped between the nut and the said projections 12 and 13. Simultaneously the bolt-head 28 bears on the cap 23 to force its wedge-like projections 25 and 26 into the upper end of the compartment 8 and also press the flange 22 tightly down upon the upper edge and flange 21 of the receptacle 5. A reverse operation will release the post 7.

The operation of the forms of construction shown in Figs. 8 to 11 inclusive is similar to that of Figs. 1 to 7 inclusive, just described so that the operation of these modifications need not be described.

I am aware that various details of construction may be varied through a wide range without departing from the principles of this invention and I therefore do not purpose limiting the patent granted otherwise than necessitated by the prior art.

I claim as my invention:

1. A device of the type set forth comprising a socket having a detachable top member, said top member having two apertures one for the reception of a post to be secured to the socket and the other for the passage of a bolt therethrough, a pair of upwardly and inwardly inclined abutments below the second aperture spaced apart a greater distance than the width of the bolt to allow the passage of the latter therebetween, a nut on the bolt adapted to engage and slide upwardly along the abutments when the bolt is rotated therein, whereby the nut may be forced into wedging engagement with the post in the socket and the top member simultaneously drawn down onto the upper end of the socket.

2. A device of the type set forth comprising a socket having a vertical wall and an opposing wall inclined upwardly and inwardly thereto, a bolt having a head adapted to engage the upper part of the socket, and a nut on the bolt adapted to engage and slide upwardly along the inclined wall as the bolt is rotated therein, whereby the nut may be forced into wedging engagement with a post inserted in the socket.

3. A device of the type set forth comprising a socket adapted to receive a post, a part of one wall of the socket and a part of the surface of the post converging toward each other, a bolt having a head adapted to engage an outer part of the socket and a nut on the bolt adapted to engage and slide between said wall and said surface as the bolt is rotated therein, whereby the nut may be forced into wedging engagement with the post.

4. An anchor for a post comprising a cylindrical socket, a rectangular pocket opening into said socket, a wedge on the wall of the pocket opposite the socket having its thickest part uppermost, a cover for both socket and pocket, a bolt through said cover into said pocket, and a nut on said bolt, the width of the pocket being less than the diagonal of said nut, and the width of the nut being greater than the distance from the upper edge of said wedge to said socket.

5. An anchor for a post comprising a cylindrical socket, a rectangular pocket opening into said socket, a wedge on the wall of the pocket opposite the socket having its thickest part uppermost, a cover for both socket and pocket, a bolt through said cover into said pocket, a nut on said bolt, the width of the pocket being less than the diagonal of said nut, and the width of the nut being greater than the distance from the upper edge of said wedge to said socket, an alining board beneath said anchor, and a flange on said anchor coöperating with the edge of said board to position said anchor.

6. An anchor for a post comprising a cylindrical socket, a rectangular pocket opening into said socket, a wedge on the wall of the pocket opposite the socket having its thickest part uppermost, a cover for both socket and pocket, a bolt through said cover into said pocket, a nut on said bolt, the width of the pocket being less than the diagonal of said nut, and the width of the nut being greater than the distance from the upper edge of said wedge to said socket, an alining board with a series of holes therein, and a projection on the bottom of said anchor coöperating with one of said holes to position said anchor.

7. An anchor for a post comprising a cylindrical socket, a rectangular pocket opening into said socket, a wedge on the wall of the pocket opposite the socket having its thickest part uppermost, a cover for both socket and pocket, a bolt through said cover into said pocket, a nut on said bolt, the width of the pocket being less than the diagonal of said nut, and the width of the nut being greater than the distance from the upper edge of said wedge to said socket, an alining board beneath said anchor, a flange on said anchor coöperating with the edge of said board to position said anchor, and a bed of concrete inclosing said anchor and alining board.

In testimony whereof I have hereunto subscribed my name in the presence of two subscribing witnesses.

ALFRED W. KNUTSON.

Witnesses:
E. N. Sherman,
W. G. Matthews.